(12) United States Patent
Tang et al.

(10) Patent No.: US 7,894,142 B1
(45) Date of Patent: Feb. 22, 2011

(54) PHOTOGRAPHING OPTICAL LENS SYSTEM

(75) Inventors: Hsiang Chi Tang, Taichung (TW); Dung Yi Hsieh, Taichung (TW); Hsin Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 12/879,744

(22) Filed: Sep. 10, 2010

(30) Foreign Application Priority Data

May 27, 2010  (TW) ............................. 99116966 A

(51) Int. Cl.
*G02B 9/12* (2006.01)
(52) U.S. Cl. ..................... 359/792; 359/716; 359/740
(58) Field of Classification Search ................ 359/792, 359/716, 740
See application file for complete search history.

(56) References Cited

U.S. PATENT DOCUMENTS

| | | | |
|---|---|---|---|
| 6,930,841 B2 * | 8/2005 | Sato ............................ | 359/784 |
| 6,961,191 B2 * | 11/2005 | Sato ............................ | 359/785 |
| 7,443,613 B2 | 10/2008 | Noda | |
| 7,525,741 B1 | 4/2009 | Noda | |
| 7,564,635 B1 * | 7/2009 | Tang ............................ | 359/792 |
| 7,742,240 B2 * | 6/2010 | Kim et al. .................... | 359/785 |
| 2008/0024880 A1 * | 1/2008 | Tang ............................ | 359/716 |
| 2008/0100925 A1 * | 5/2008 | Nakanishi .................... | 359/716 |
| 2009/0168202 A1 * | 7/2009 | Kwon ........................... | 359/716 |
| 2009/0201593 A1 * | 8/2009 | Isono ........................... | 359/716 |
| 2010/0188758 A1 * | 7/2010 | Iba et al. ...................... | 359/716 |
| 2010/0259838 A1 * | 10/2010 | Tsai et al. .................... | 359/716 |

* cited by examiner

*Primary Examiner*—Evelyn A. Lester
(74) *Attorney, Agent, or Firm*—Tim Tingkang Xia; Morris, Manning & Martin, LLP

(57) ABSTRACT

This invention provides a photographing optical lens system in order from an object side to an image side including: a first lens element with positive refractive power having a convex object-side surface, a second lens element with positive refractive power having a convex image-side surface, a third lens element with positive refractive power having a convex object-side surface and a concave image-side surface, both the two surfaces being aspheric and at least one of them having at least one inflection point formed thereon; wherein the photographing optical lens system further comprises an aperture stop configured between an imaged-object and the second lens element, and there are three lens elements with refractive power.

25 Claims, 13 Drawing Sheets

| TABLE 1 | | | | | | |
|---|---|---|---|---|---|---|
| (Embodiment 1) | | | | | | |
| f = 1.29 mm, Fno = 2.10, HFOV = 36.9 deg. | | | | | | |
| Surface # | | Curvature Radius | Thickness | Material | Index | Abbe # | Focal length |
| 0 | Object | Plano | Infinity | | | | |
| 1 | Lens 1 | 1.80172 (ASP) | 0.515 | Plastic | 1.544 | 55.9 | 3.87 |
| 2 | | 11.16630 (ASP) | 0.252 | | | | |
| 3 | Ape. Stop | Plano | 0.105 | | | | |
| 4 | Lens 2 | -0.92923 (ASP) | 0.541 | Plastic | 1.544 | 55.9 | 2.79 |
| 5 | | -0.69448 (ASP) | 0.105 | | | | |
| 6 | Lens 3 | 0.56015 (ASP) | 0.325 | Plastic | 1.544 | 55.9 | 3.72 |
| 7 | | 0.61601 (ASP) | 0.200 | | | | |
| 8 | IR-filter | Plano | 0.145 | Glass | 1.517 | 64.2 | - |
| 9 | | Plano | 0.050 | | | | |
| 10 | cover glass | Plano | 0.400 | Glass | 1.517 | 64.2 | - |
| 11 | | Plano | 0.129 | | | | |
| 12 | Image | Plano | - | | | | |

Fig. 5A

| TABLE 2 | | | | | | |
|---|---|---|---|---|---|---|
| Aspheric Coefficients | | | | | | |
| Surface # | 1 | 2 | 4 | 5 | 6 | 7 |
| k = | -5.56699E-01 | 1.00337E+02 | 4.66963E-01 | -6.45254E-01 | -6.75764E+00 | -2.45315E+00 |
| A4 = | 2.01540E-01 | 6.87460E-01 | -8.71399E-01 | -3.96075E+00 | -9.83666E-01 | -1.23517E+00 |
| A6 = | 4.97998E-02 | -2.32758E+00 | -4.41415E+01 | 2.07178E+01 | 3.51094E+00 | 2.69090E+00 |
| A8 = | 7.76874E-02 | 3.38417E+00 | 1.15259E+03 | -7.31889E+01 | -7.54428E+00 | -3.73271E+00 |
| A10= | -1.37887E-01 | -1.91633E+00 | -1.61244E+04 | 8.14713E+01 | 7.63143E+00 | 2.05919E+00 |
| A12= | | | 8.22310E+04 | | -2.68037E+00 | -1.64337E-01 |

Fig. 5B

| TABLE 3 | | | | | | | |
|---|---|---|---|---|---|---|---|
| (Embodiment 2) | | | | | | | |
| f = 1.10 mm, Fno = 2.04, HFOV = 32.4 deg. | | | | | | | |
| Surface # | | Curvature Radius | Thickness | Material | Index | Abbe # | Focal length |
| 0 | Object | Plano | Infinity | | | | |
| 1 | Lens 1 | 1.01372 (ASP) | 0.493 | Plastic | 1.535 | 56.3 | 2.35 |
| 2 | | 4.37680 (ASP) | 0.130 | | | | |
| 3 | Ape. Stop | Plano | 0.069 | | | | |
| 4 | Lens 2 | -0.94235 (ASP) | 0.397 | Plastic | 1.535 | 56.3 | 4.81 |
| 5 | | -0.79105 (ASP) | 0.141 | | | | |
| 6 | Lens 3 | 0.36954 (ASP) | 0.280 | Plastic | 1.535 | 56.3 | 2.24 |
| 7 | | 0.39348 (ASP) | 0.463 | | | | |
| 8 | Image | Plano | - | | | | |

Fig. 6A

| TABLE 4 | | | | | | |
|---|---|---|---|---|---|---|
| Aspheric Coefficients | | | | | | |
| Surface # | 1 | 2 | 4 | 5 | 6 | 7 |
| k  = | -6.14145E-01 | -5.51874E+00 | 4.18110E+00 | 3.03340E+00 | -4.91755E+00 | -3.01515E+00 |
| A4 = | 1.69307E-01 | 1.20335E+00 | -3.72806E+00 | -9.69681E+00 | -3.42851E+00 | -3.36942E+00 |
| A6 = | 1.00531E+00 | -1.09679E+01 | 7.91653E+01 | 1.04159E+02 | 1.06793E+01 | 1.55754E+01 |
| A8 = | -1.13672E+00 | 3.00507E+01 | -2.65469E+03 | -6.75755E+02 | -2.65276E+01 | -5.87454E+01 |
| A10= | | | 2.34762E+04 | 1.85299E+03 | 6.19471E+01 | 1.45093E+02 |
| A12= | | | 1.71634E+04 | | -1.67972E+02 | -2.17333E+02 |
| A14= | | | | | | 1.33014E+02 |

Fig. 6B

| TABLE 5 | | | | | | |
|---|---|---|---|---|---|---|
| (Embodiment 3) | | | | | | |
| f = 1.10 mm, Fno = 2.04, HFOV = 32.4 deg. | | | | | | |
| Surface # | | Curvature Radius | Thickness | Material | Index | Abbe # | Focal length |
| 0 | Object | Plano | Infinity | | | | |
| 1 | Lens 1 | 1.06020 (ASP) | 0.419 | Plastic | 1.535 | 56.3 | 1.96 |
| 2 | | -93.43000 (ASP) | 0.126 | | | | |
| 3 | Ape. Stop | Plano | 0.097 | | | | |
| 4 | Lens 2 | -0.83385 (ASP) | 0.364 | Plastic | 1.535 | 56.3 | -8.92 |
| 5 | | -1.16421 (ASP) | 0.050 | | | | |
| 6 | | Plano | 0.091 | | | | |
| 7 | Lens 3 | 0.34494 (ASP) | 0.306 | Plastic | 1.535 | 56.3 | 1.47 |
| 8 | | 0.42516 (ASP) | 0.462 | | | | |
| 9 | Image | Plano | - | | | | |
| Note: On surface #6, the effective diameter is 0.86mm | | | | | | | |

Fig. 7A

| TABLE 6 | | | | | | |
|---|---|---|---|---|---|---|
| Aspheric Coefficients | | | | | | |
| Surface # | 1 | 2 | 4 | 5 | 7 | 8 |
| k = | -8.00137E-01 | 2.00000E+01 | 3.75323E+00 | 7.65625E+00 | -4.18574E+00 | -1.83957E+00 |
| A4 = | 7.38642E-02 | 6.19714E-01 | -3.12520E+00 | -1.05525E+01 | -2.23847E+00 | -3.82527E+00 |
| A6 = | 1.24327E+00 | -9.08350E+00 | 6.76862E+01 | 1.06297E+02 | 7.62350E+00 | 1.72453E+01 |
| A8 = | -4.22081E+00 | 2.62386E+01 | -1.74420E+03 | -6.62390E+02 | -3.19460E+01 | -6.28597E+01 |
| A10= | | | 1.39147E+04 | 1.78395E+03 | 9.97220E+01 | 1.48799E+02 |
| A12= | | | 1.71634E+04 | | -1.67972E+02 | -2.05985E+02 |
| A14= | | | | | | 1.15711E+02 |

Fig. 7B

| TABLE 7 | | | | | | | |
|---|---|---|---|---|---|---|---|
| (Embodiment 4) | | | | | | | |
| f = 1.02 mm, Fno = 2.04, HFOV = 32.5 deg. | | | | | | | |
| Surface # | | Curvature Radius | Thickness | Material | Index | Abbe # | Focal length |
| 0 | Object | Plano | Infinity | | | | |
| 1 | Lens 1 | 1.00604 (ASP) | 0.434 | Plastic | 1.544 | 55.9 | 1.93 |
| 2 | | 20.00000 (ASP) | 0.133 | | | | |
| 3 | Ape. Stop | Plano | 0.102 | | | | |
| 4 | Lens 2 | -0.93179 (ASP) | 0.351 | Plastic | 1.535 | 56.3 | -8.22 |
| 5 | | -1.33772 (ASP) | 0.141 | | | | |
| 6 | Lens 3 | 0.34325 (ASP) | 0.388 | Plastic | 1.535 | 56.3 | 1.28 |
| 7 | | 0.41691 (ASP) | 0.318 | | | | |
| 8 | Image | Plano | - | | | | |

Fig. 8A

| TABLE 8 | | | | | | |
|---|---|---|---|---|---|---|
| Aspheric Coefficients | | | | | | |
| Surface # | 1 | 2 | 4 | 5 | 6 | 7 |
| k = | -6.42155E-01 | -1.10018E+03 | 4.60031E+00 | 8.96228E+00 | -4.15650E+00 | -1.61841E+00 |
| A4 = | 9.88038E-02 | 6.29247E-01 | -3.51821E+00 | -1.12975E+01 | -1.86514E+00 | -3.72366E+00 |
| A6 = | 1.28650E+00 | -8.83026E+00 | 5.80056E+01 | 1.04939E+02 | 7.22186E+00 | 1.74856E+01 |
| A8 = | -4.29277E+00 | 2.44304E+01 | -2.13034E+03 | -6.60161E+02 | -3.29792E+01 | -6.41228E+01 |
| A10= | | | 2.75704E+04 | 1.79235E+03 | 1.05761E+02 | 1.51001E+02 |
| A12= | | | 1.71634E+04 | | -1.40556E+02 | -2.04017E+02 |
| A14= | | | | | | 1.07804E+02 |

Fig. 8B

| TABLE 9 | | | | |
|---|---|---|---|---|
|  | Embodiment 1 | Embodiment 2 | Embodiment 3 | Embodiment 4 |
| f | 1.29 | 1.10 | 1.10 | 1.02 |
| Fno | 2.10 | 2.04 | 2.04 | 2.04 |
| HFOV | 36.9 | 32.4 | 32.4 | 32.5 |
| CT3/CT1 | 0.63 | 0.57 | 0.73 | 0.89 |
| T23/f | 0.08 | 0.13 | 0.13 | 0.14 |
| R5/f | 0.43 | 0.34 | 0.31 | 0.34 |
| R6/f | 0.48 | 0.36 | 0.39 | 0.41 |
| (R3+R4)/(R3−R4) | 6.92 | 11.46 | −6.05 | −5.59 |
| (R5+R6)/(R5−R6) | −21.06 | −31.87 | −9.60 | −10.32 |
| f/f1 | 0.33 | 0.47 | 0.56 | 0.53 |
| |f/f2| | 0.46 | 0.23 | 0.12 | 0.12 |
| f3/f1 | 0.96 | 0.95 | 0.75 | 0.66 |
| SL/TTL | 0.70 | 0.68 | 0.72 | 0.70 |
| TTL/ImgH | 2.68 | 2.82 | 2.74 | 2.90 |

Fig. 9

PHOTOGRAPHING OPTICAL LENS SYSTEM

CROSS-REFERENCE TO RELATED APPLICATIONS

This non-provisional application claims priority under 35 U.S.C. §119(a) on Patent Application No(s). 099116966 filed in Taiwan, R.O.C. on May 27, 2010, the entire contents of which are hereby incorporated by reference.

BACKGROUND OF THE INVENTION

1. Field of the Invention

The present invention relates to a photographing optical lens assembly, and more particularly, to a compact photographing optical lens assembly used in electronic devices.

2. Description of the Prior Art

In recent years, with the popularity of mobile phone cameras, the demand for compact imaging lenses is increasing, and the sensor of a general photographing camera is none other than CCD (charge coupled device) or CMOS device (Complementary Metal Oxide Semiconductor device). Furthermore, as advanced semiconductor manufacturing technology has allowed the pixel size of sensors to be reduced and the resolution of compact imaging lenses has gradually increased, there is an increasing demand for compact imaging lenses featuring better image quality.

A conventional compact photographing optical lens system, such as the one disclosed in U.S. Pat. No. 7,525,741, generally comprises two lens elements in order to reduce costs. However, the composition of two lens elements system has limited ability in correcting aberration, which is unable to satisfy the needs of high end imaging lens modules. On the other hand, when utilizing lens systems with more than two lens elements, the total track length of the lens assembly will be too long for the photographing optical lens system to stay compact.

In order to obtain high image quality while maintaining the feature of compactness, a photographing optical lens system comprising three lens elements becomes a viable solution, such as a three-lens-element photographing optical lens system disclosed in U.S. Pat. No. 7,443,613. This design has a bi-concave third lens element which easily increases the system sensitivity, and such arrangement will decrease the distance between the exit pupil and the image plane of the system, causing the incident angle of chief ray projecting onto the image plane to increase, which will reduce the amount of brightness surrounding the system and the image quality.

Therefore, a need exists in the art for a photographing optical lens system that features better image quality, maintains a moderate total track length and is applicable to compact portable electronic products.

SUMMARY OF THE INVENTION

The present invention provides a photographing optical lens system comprising: in order from an object side to an image side: a first lens element with positive refractive power having a convex object-side surface; a second lens element with positive refractive power having a convex image-side surface; a third lens element with positive refractive power having a convex object-side surface and a concave image-side surface, the object-side and image-side surfaces thereof being aspheric, at least one of the surfaces having at least on inflection point; wherein the photographing optical lens system further comprises an aperture stop disposed between the imaged object and the second lens element; wherein there are three lens elements with the refractive power, the focal length of the photographing optical lens system is f, the focal length of the first lens element is f1, the distance on the optical axis between the second and the third lens elements is T23, and they satisfy the relation:

$$0.23 < f/f1 < 0.67;$$

$$0.05 < T23/f < 0.18$$

According to another aspect of the present invention, a photographing optical lens system comprises, in order from an object side to an image side: a first lens element with positive refractive power having a convex object-side surface; a second lens element with positive refractive power having a convex image-side surface; a third lens element with positive refractive power having a convex object-side surface and a concave image-side surface, the object-side and image-side surfaces thereof being aspheric, made of plastic; wherein the photographing optical lens system further comprises an aperture stop disposed between the imaged object and the second lens element; wherein there are three lens elements with refractive power, the focal length of the first lens element is f1, the focal length of the third lens element is f3, the radius of curvature on the image-side surface of the third lens element is R6, the focal length of the photographing optical lens system is f, and they satisfy the relation:

$$0.3 < f3/f1 < 1.3;$$

$$0.0 < R6/f < 1.0$$

According to another aspect of the present invention, a photographing optical lens system comprises, in order from an object side to an image side: a first lens element with positive refractive power having a convex object-side surface; a second lens element having a concave object-side surface and a convex image-side surface; a third lens element with positive refractive power having a convex object-side surface, the object-side and image-side surfaces thereof being aspheric, at least one of the surfaces having at least one inflection point; wherein the photographing optical lens system further comprises an aperture stop disposed between the imaged object and the second lens element; wherein there are three lens elements with refractive power, the focal length of the photographing optical lens system is f, the focal length of the first lens element is f1, the radius of curvature on the object-side surface of the second lens element is R3, the radius of curvature on the image-side surface of the second lens element is R4, the radius of curvature on the object-side surface of the third lens element is R5, the radius of curvature on the image-side surface of the third lens element is R6, and they satisfy the relation:

$$0.23 < f/f1 < 0.67;$$

$$|(R3+R4)/(R3-R4)| < |(R5+R6)/(R5-R6)|$$

Such an arrangement of optical elements can reduce the size as well as the sensitivity of the optical system and obtain higher resolution.

In the present photographing optical lens system, the first lens element has positive refractive power supplying a portion of refractive power in the system, which can reduce the total track length of the photographing optical lens system. The second lens element can have positive or negative refractive power. When the second lens element has positive refractive power, the refractive power of the first and the third lens elements can be effectively distributed to reduce the sensitivity of the photographing optical lens system. When the second lens element has negative refractive power, the chromatic aberration of the system can be favorably corrected to increase the image quality of the system. The third lens element has positive refractive power, which can provide a portion of the refractive power for the photographing optical lens system while correcting the aberration generated by the second lens element.

In the present photographing optical lens system, the first lens element may be a bi-convex lens element or a meniscus lens element having a convex object-side surface and a concave image-side surface. When the first lens element is a bi-convex lens element, the refractive power thereof can be effectively enhanced, thus shortening the total track length of the photographing optical lens system. When the first lens element is a convex-concave meniscus lens element, the astigmatism of the system can be corrected more favorably with higher image quality. The second lens element having a concave object-side surface and a convex image-side surface can favorably correct the aberration from the first lens element and the astigmatism of the system, while reducing the sensitivity of the photographing optical lens assembly. The third lens element having a convex object-side surface and a concave image-side surface can correct the astigmatism and high order aberration of the photographing optical lens system effectively.

In the aforementioned photographing optical lens system, the aperture stop can be disposed between the imaged object and the first lens element or between the first lens element and the second lens element. Through having the first lens element providing positive refractive power and the aperture stop disposed near the object side of the photographing optical lens system, the total optical track length of the photographing optical lens system can be reduced effectively. In addition, the aforementioned arrangement also enables the exit pupil of the photographing optical lens system to be positioned far away from the image plane, thus light will be projected onto the electronic sensor at a nearly perpendicular angle, and this is the telecentric feature of the image side. The telecentric feature is very important to the photosensitivity of the solid-state sensor as it can improve the photosensitivity of the sensor and reduce the probability of the shading occurrence. Moreover, the third lens element is provided with at least one inflection point, thereby the angle at which the light is projected onto the sensor from the off-axis field can be effectively reduced to further correct the off-axis aberrations. In addition, when the aperture stop is disposed closer to the second lens element, a wide field of view can be favorably achieved. Such stop placement facilitates the correction of the distortion and chromatic aberration of magnification, and the mitigation of the system's sensitivity. Therefore, in the present photographing optical lens system, when the aperture stop is disposed closer to the imaged object, the telecentric feature is more pronounced, which can further reduce the total track length of the photographing optical lens system. When the aperture stop is disposed closer to the second lens element, the wide field of view feature is emphasized in order to reduce the sensitivity of the photographing optical lens system effectively.

BRIEF DESCRIPTION OF THE DRAWINGS

FIG. 5A is TABLE 1 which lists the optical data of the first embodiment.

FIG. 5B is TABLE 2 which lists the aspheric surface data of the first embodiment.

FIG. 6A is TABLE 3 which lists the optical data of the second embodiment.

FIG. 6B is TABLE 4 which lists the aspheric surface data of the second embodiment.

FIG. 7A is TABLE 5 which lists the optical data of the third embodiment.

FIG. 7B is TABLE 6 which lists the aspheric surface data of the third embodiment.

FIG. 8A is TABLE 7 which lists the optical data of the fourth embodiment.

FIG. 8B is TABLE 8 which lists the aspheric surface data of the fourth embodiment.

FIG. 9 is TABLE 9 which lists the data of the respective embodiments resulting from the equations.

DETAILED DESCRIPTION OF THE PREFERRED EMBODIMENTS

Figure 1A:
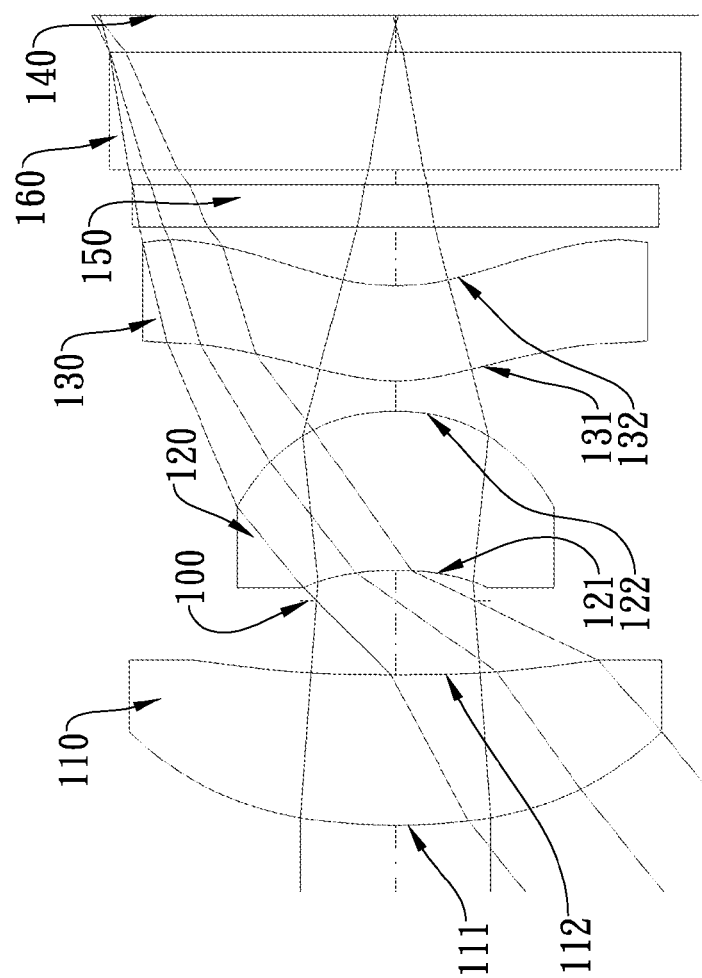
FIG. 1A shows a photographing optical lens system in accordance with a first embodiment of the present invention.

The present invention provides a photographing optical lens system comprising, in order from the object side to the image side: a first lens element with positive refractive power having a convex object-side surface; a second lens element with positive refractive power having a convex image-side surface; a third lens element with positive refractive power having a convex object-side surface and a concave image-side surface, the object-side and the image-side surfaces thereof being aspheric, at least one of the surfaces having at least one inflection point; wherein the photographing optical lens system further comprises an aperture stop disposed between the imaged object and the second lens element, and there are three lens elements with refractive power; wherein the focal length of the photographing optical lens system is f, the focal length of the first lens element is f1, the distance on the optical axis between the second and the third lens elements is T23, and they satisfy the relation:

$$0.23 < f/f1 < 0.67;$$

$$0.05 < T23/f < 0.18$$

When the aforementioned photographing optical lens system satisfies the relation: $0.23 < f/f1 < 0.67$, the refractive power of the first lens element is more balanced, which effectively controls the total track length of the photographing optical lens system to enable the compact feature of the system while preventing the high order spherical aberration from becoming too large, in order to improve image quality; preferably, they satisfy the relation: $0.30 < f/f1 < 0.57$. When the aforementioned photographing optical lens system satisfies the relation: $0.05 < T23/f < 0.18$, the distance on the axis between the second and the third lens elements can be maintained at a favorable length, avoiding difficulties in assembly process due to a small spacing or having a greater size lens assembly from a large spacing; preferably, they satisfy the relation: 0.07<T23/f<0.14.

In the aforementioned photographing optical lens system, the focal length of the photographing optical lens system is f, the focal length of the second lens element is f2, and preferably, they satisfy the relation: 0.1<f/f2<0.5. When f/f2 satisfy the above relation, the refractive power of the second lens element can be avoided from becoming too large, which can reduce the aberration in the photographing optical lens system and the sensitivity of the system.

In the aforementioned photographing optical lens system, the thickness on the optical axis of the third lens element is CT3, the thickness on the optical axis of the first lens element is CT1, and preferably, they satisfy the relation: 0.4<CT3/CT1<0.8. When CT3/CT1 satisfy the relation, the thickness of the first and the third lens elements are more favorable for moldability and homogeneity of the injection molding of the plastic lenses, preventing lens assembling affected by the lens thickness being too large or too small, and enabling improved image quality of the photographing optical lens system.

In the aforementioned photographing optical lens system, an electronic sensor is provided at the image plane for image formation; wherein the distance on the optical axis between the aperture stop and the electronic sensor is SL, the distance on the optical axis between the object-side surface of the first lens element and the electronic sensor is TTL, and preferably, they satisfy the relation: 0.6<SL/TTL<0.9. When SL/TTL satisfy the above relation, a good balance between the telecentric feature and the wide field of view in the photographing optical lens system can be obtained.

In the aforementioned photographing optical lens system, the focal length of the third lens element is f3, the focal length of the first lens element is f1, and preferably, they satisfy the relation: 0.6<f3/f1<1.1. When f3/f1 satisfy the above relation, the relative strength of refractive power between the first lens element and the third lens element can be maintained at a state which avoids generation of too much aberration.

In the aforementioned photographing optical lens system, the radii of curvature on the object-side and the image-side surfaces of the second lens element are R3 and R4 respectively, and preferably, they satisfy the relation: 5<(R3+R4)/(R3−R4)<13. When (R3+R4)/(R3−R4) satisfy the above relation, the shape of the second lens element is favorable in correcting the astigmatism of the photographing optical lens system.

In the aforementioned photographing optical lens system, the radius of curvature on the image-side surface on the third lens element is R6, the focal length of the photographing optical lens system is f, and preferably, they satisfy the relation: 0.0<R6/f<1.0. When R6/f satisfy the above relation, the principal point of the photographing optical lens system can be positioned further away from the image plane, which reduces the total optical track length of the lens system in order to maintain its compact size.

In the aforementioned photographing optical lens system, the radii of curvature on the object-side and the image-side surfaces of the second lens element are R3 and R4 respectively, the radii of curvature on the object-side and the image-side surfaces of the third lens element are R5 and R6 respectively, and preferably, they satisfy the relation: |(R3+R4)/(R3−R4)|<|(R5+R6)/(R5−R6)|. When |(R3+R4)/(R3−R4)| and |(R5+R6)/(R5−R6)| satisfy the above relation, the lens shape of the second and the third lens elements can be maintained favorably to reduce the aberration of the photographing optical lens system.

In the aforementioned photographing optical lens system, the photographing optical lens system further comprises an electronic sensor disposed at the image plane for image formation; wherein the distance on the optical axis between the object-side surface of the first lens element and the electronic sensor is TTL, half of the diagonal length of the effective pixel area of the electronic sensor is ImgH, and preferably, they satisfy the relation: TTL/ImgH<3.0. When TTL/ImgH satisfy the above relation, the compact size of the photographing optical lens system can be favorably maintained for use in lightweight portable electronics.

According to another aspect of the present invention, a photographing optical lens system comprises, in order from the object side to the image side: a first lens element with positive refractive power having a convex object-side surface; a second lens element with positive refractive power having a convex image-side surface; a third lens element with positive refractive power having a convex object-side surface and a concave image-side surface, the object-side and the image-side surfaces thereof being aspheric, made of plastic; wherein the photographing optical lens system further comprises an aperture stop disposed between the imaged object and the second lens element, and there are three lens elements with refractive power; and wherein the focal length of the first lens element is f1, the focal length of the third lens element is f3, the radius of curvature on the image-side surface of the third lens element is R6, the focal length of the photographing optical lens system is f, and they satisfy the relation:

$$0.3 < f3/f1 < 1.3;$$

$$0.0 < R6/f < 1.0$$

When the aforementioned photographing optical lens system satisfies the relation: 0.3<f3/f1<1.3, the relative strength of refractive power between the first and the third lens elements is favorably maintained while avoiding too much aberration. When the aforementioned photographing optical lens system satisfies the relation: 0.0<R6/f<1.0, the principal point of the photographing optical lens system can be positioned further away from the image plane, which reduces the total optical track length of the lens assembly, in order for the system to stay compact; preferably, they satisfy the relation: 0.2<R6/f<0.6.

In the aforementioned photographing optical lens system, the third lens element is made of plastic. Plastic material is favorable in production of non-spherical lenses as well as effectively reducing production costs.

In the aforementioned photographing optical lens system, preferably, the second lens element has a concave object-side surface and at least one of the surfaces thereof being aspheric.

In the aforementioned photographing optical lens system, the focal length of the photographing optical lens system is f, the focal length of the first lens element is f1, and they satisfy the relation: 0.23<f/f1<0.67. When f/f1 satisfy the above relation, the refractive power of the first lens element is more balanced, which can effectively control the total track length of the system to stay compact while preventing high order spherical aberration from becoming too large, in order to improve image quality.

In the aforementioned photographing optical lens system, an electronic sensor is further provided at the image plane for image formation; wherein the distance on the optical axis between the aperture stop and the electronic sensor is SL, the distance on the optical axis between the object-side surface of the first lens element and the electronic sensor is TTL, and preferably, they satisfy the relation: 0.6<SL/TTL<0.9. When SL/TTL satisfy the above relation, a favorable balance can be obtained between the telecentric feature and the wide field of view of the photographing optical lens system.

In the aforementioned photographing optical lens system, the radii of curvature on the object-side and the image-side surfaces of the second lens element are R3 and R4 respectively, the radii of curvature on the object-side and the image-side surfaces of the third lens element are R5 and R6 respectively, and preferably, they satisfy the relation: $|(R3+R4)/(R3-R4)|<|(R5+R6)/(R5-R6)|$. When $|(R3+R4)/(R3-R4)|$ and $|(R5+R6)/(R5-R6)|$ satisfy the above relation, the favorable shapes of the second and the third lens elements can be maintained to reduce aberration of the photographing optical lens system.

In the aforementioned photographing optical lens system, the radii of curvature on the object-side and the image-side surfaces of the second lens element are R3 and R4 respectively, and preferably, they satisfy the relation: $5<(R3+R4)/(R3-R4)<13$. When $(R3+R4)/(R3-R4)$ satisfy the above relation, the shape of the second lens element is more favorable in correcting the astigmatism of the photographing optical lens system.

In the aforementioned photographing optical lens system, the distance on the optical axis between the second and the third lens elements is T23, the focal length of the photographing optical lens system is f, and preferably, they satisfy the relation: $0.05<T23/f<0.18$. When T23/f satisfy the above relation, the distance on the axis between the second and the third lens elements can be maintained at a favorable length, avoiding difficulties in assembly process due to a small spacing or having a greater size lens assembly from a large spacing.

According to another aspect of the present invention, a photographing optical lens system comprises, in order from the object side to the image side: a first lens element with positive refractive power having a convex object-side surface; a second lens element having a concave object-side surface and a convex image-side surface; a third lens element with positive refractive power having a convex object-side surface, the object-side and the image-side surfaces thereof being aspheric, at least one of the surfaces having at least one inflection point; wherein the photographing optical lens system further comprises an aperture stop disposed between the imaged object and the second lens element, and there are three lens elements with refractive power; and wherein the focal length of the photographing optical lens system is f, the focal length of the first lens element is f1, the radius of curvature on the object-side surface of the second lens element is R3, the radius of curvature on the image-side surface of the second lens element is R4, the radius of curvature on the object-side surface of the third lens element is R5, the radius of curvature on the image-side surface of the third lens element is R6, and they satisfy the relation:

$0.23<f/f1<0.67;$ $|(R3+R4)/(R3-R4)|<|(R5+R6)/(R5-R6)|$

When the aforementioned photographing optical lens system satisfies the relation: $0.23<f/f1<0.67$, the refractive power of the first lens element is more balanced, which effectively controls the total track length to maintain the compact feature while preventing the high order spherical aberration from becoming too large, in order to improve image quality; preferably, they satisfy the relation: $0.30<f/f1<0.57$.

When the aforementioned photographing optical lens system satisfies the relation: $|(R3+R4)/(R3-R4)|<|(R5+R6)/(R5-R6)|$, the shapes of the second and the third lens elements can be maintained favorably to reduce the aberration of the photographing optical lens system.

In the aforementioned photographing optical lens system, preferably, the first lens element has a concave image-side surface. In the aforementioned photographing optical lens system, the focal length of the third lens element is f3, the focal length of the first lens element is f1, and preferably, they satisfy the relation: $0.3<f3/f1<1.3$. When f3/f1 satisfy the above relation, the relative strength of the refractive power between the first and the third lens elements is favorably distributed in order to prevent too much aberration.

In the aforementioned photographing optical lens system, the distance on the optical axis between the second and the third lens elements is T23, the focal length of the photographing optical lens system is f, and preferably, they satisfy the relation: $0.05<T23/f<0.18$. When T23/f satisfy the above relation, the distance on the axis between the second and the third lens elements can be maintained at a favorable length, avoiding difficulties in assembly process due to a small spacing or having a greater size lens assembly from a large spacing.

In the aforementioned photographing optical lens system, there is at least one aspheric surface from the object-side and the image-side surfaces. In the aforementioned photographing optical lens system, the focal length of the photographing optical lens system is f, the focal length of the second lens element is f2, and preferably, they satisfy the relation: $|f/f2|0.5$. When $|f/f2|$ satisfy the above relation, the refractive power of the second lens element can be controlled from becoming too large, while reducing the aberration of the system and also reducing the sensitivity of the photographing optical lens system.

In the aforementioned photographing optical lens system, the radius of curvature on the object-side surface of the third lens element is R5, the focal length of the photographing optical lens system is f, and preferably, they satisfy the relation: $0.25<R5/f<0.65$. When R5/f satisfy the above relation, the incident angle of the light projecting onto the sensor can be decreased, in order to improve the photosensitivity of the photographing optical lens system.

In the aforementioned photographing optical lens system, the radius of curvature on the image-side surface of the third lens element is R6, the focal length of the photographing optical lens system is f, and preferably, they satisfy the relation: $0.0<R6/f<1.0$. When R6/f satisfy the above relation, the principal point of the lens system can be positioned further away from the image plane, which reduces the total optical track length of the system in order to keep it compact.

In the aforementioned photographing optical lens system, the focal length of the third lens element is f3, the focal length of the first lens element is f1, and preferably, they satisfy the relation: $0.6<f3/f1<1.1$. When f3/f1 satisfy the above relation, the relative strength of the refractive power between the first and the third lens elements is favorably distributed in order to prevent too much aberration.

In the present photographing optical lens system, the lens elements can be made of glass or plastic. If the lens elements are made of glass, there is more freedom in distributing the refractive power of the system. If plastic material is adopted to produce the lens elements, the production cost will be reduced effectively. Additionally, the surfaces of the lens elements can be aspheric and easily made into non-spherical profiles, allowing more design parameter freedom which can be used to reduce aberrations and the number of the lens elements, so that the total track length of the photographing optical lens system can be effectively reduced.

In the present photographing optical lens system, if a lens element has a convex surface, it means the portion of the surface in proximity to the axis is convex; if a lens element has a concave surface, it means the portion of the surface in proximity to the axis is concave.

Preferred embodiments of the present invention will be described in the following paragraphs by referring to the accompanying drawings.

Figure 1B:
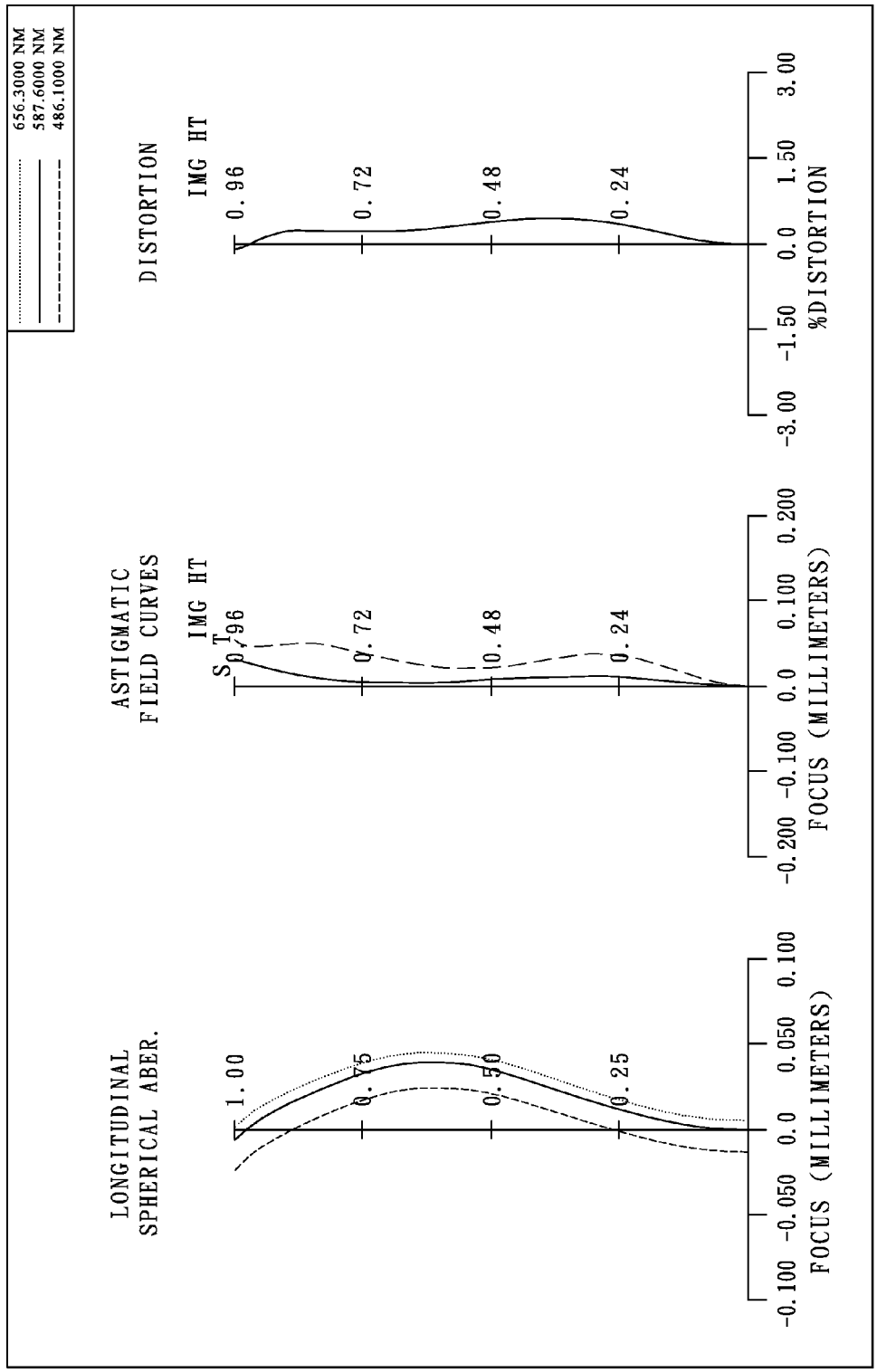
FIG. 1B shows the aberration curves of the first embodiment of the present invention.

FIG. 1A shows a photographing optical lens system in accordance with a first embodiment of the present invention, and FIG. 1B shows the aberration curves of the first embodiment of the present invention. The photographing optical lens system of the first embodiment of the present invention mainly comprises three lens elements, in order from the object side to the image side: a plastic first lens element 110 with positive refractive power having a convex object-side surface 111 and a concave image-side surface 112, the object-side and image-side surfaces 111 and 112 thereof being aspheric; a plastic second lens element 120 with positive refractive power having a concave object-side surface 121 and a convex image-side surface 122, the object-side and image-side surfaces 121 and 122 thereof being aspheric; a plastic third lens element 130 with positive refractive power having a convex object-side surface 131 and a concave image-side surface 132, the object-side and image-side surfaces 131 and 132 thereof being aspheric, at least one of the surfaces having at least one inflection point; wherein an aperture stop 100 is disposed between the first lens element 110 and the second lens element 120; wherein an IR filter 150 is disposed between the image-side surface 132 of the third lens element 130 and an image plane 140, a cover-glass 160 is disposed between the IR filter 150 and the image plane 140; and wherein the IR filter 150 is made of glass and has no influence on the focal length of the photographing optical lens system.

The equation of the aspheric surface profiles is expressed as follows:

$$X(Y) = (Y^2/R)/(1+sqrt(1-(1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present photographing optical lens system, the focal length of the photographing optical lens system is f, and it satisfies the relation: f=1.29 (mm).

In the first embodiment of the present photographing optical lens system, the f-number of the photographing optical lens system is Fno, and it satisfies the relation: Fno=2.10.

In the first embodiment of the present photographing optical lens system, half of the maximal field of view of the photographing optical lens system is HFOV, and it satisfies the relation: HFOV=36.9 deg.

In the first embodiment of the present photographing optical lens system, the thickness on the optical axis of the third lens element 130 is CT3, the thickness on the optical axis of the first lens element 110 is CT1, and they satisfy the relation:

$CT3/CT1=0.63$

In the first embodiment of the present photographing optical lens system, the distance on the optical axis between the second lens element 120 and the third lens element 130 is T23, the focal length of the photographing optical lens system is f, and they satisfy the relation:

$T23/f=0.08$

In the first embodiment of the present photographing optical lens system, the radius of curvature on the object-side surface 131 of the third lens element 130 is R5, the focal length of the photographing optical lens system is f, and they satisfy the relation:

$R5/f=0.43$

In the first embodiment of the present photographing optical lens system, the radius of curvature on the image-side surface 132 of the third lens element 130 is R6, the focal length of the photographing optical lens system is f, and they satisfy the relation:

$R6/f=0.48$

In the first embodiment of the present photographing optical lens system, the radius of curvature on the object-side surface 121 of the second lens element 120 is R3, the radius of curvature on the image-side surface 122 of the second lens element 120 is R4, and they satisfy the relation:

$(R3+R4)/(R3-R4)=6.92$

In the first embodiment of the present photographing optical lens system, the radius of curvature on the object-side surface 131 of the third lens element 130 is R5, the radius of curvature on the image-side surface 132 of the third lens element 130 is R6, and they satisfy the relation:

$(R5+R6)/(R5-R6)=-21.06$

In the first embodiment of the present photographing optical lens system, the focal length of the photographing optical lens system is f, the focal length of the first lens element 110 is f1, and they satisfy the relation:

$f/f1=0.33$

In the first embodiment of the present photographing optical lens system, the focal length of the photographing optical lens system is f, the focal length of the second lens element 120 is f2, and they satisfy the relation:

$|f/f2|=0.46$

In the first embodiment of the present photographing optical lens system, the focal length of the third lens element 130 is f3, the focal length of the first lens element 110 is f1, and they satisfy the relation:

$f3/f1=0.96$

In the first embodiment of the present photographing optical lens system, an electronic sensor is disposed at the image plane 140 for image formation. The distance on the optical axis between the aperture stop 100 and the electronic sensor is SL, the distance on the optical axis between the object-side surface 111 of the first lens element 110 and the electronic sensor is TTL, and they satisfy the relation:

$SL/TTL=0.70$

In the first embodiment of the present photographing optical lens system, the distance on the optical axis between the object-side surface 111 of the first lens element 110 and the electronic sensor is TTL, half of the diagonal length of the effective pixel area of the electronic sensor is ImgH, and they satisfy the relation:

$TTL/ImgH=2.68$

The detailed optical data of the first embodiment is shown in FIG. 5A (TABLE 1), and the aspheric surface data is shown in FIG. 5B (TABLE 2), wherein the units of the radius of curvature, the thickness and the focal length are expressed in mm, and HFOV is half of the maximal field of view.

Figure 2A:
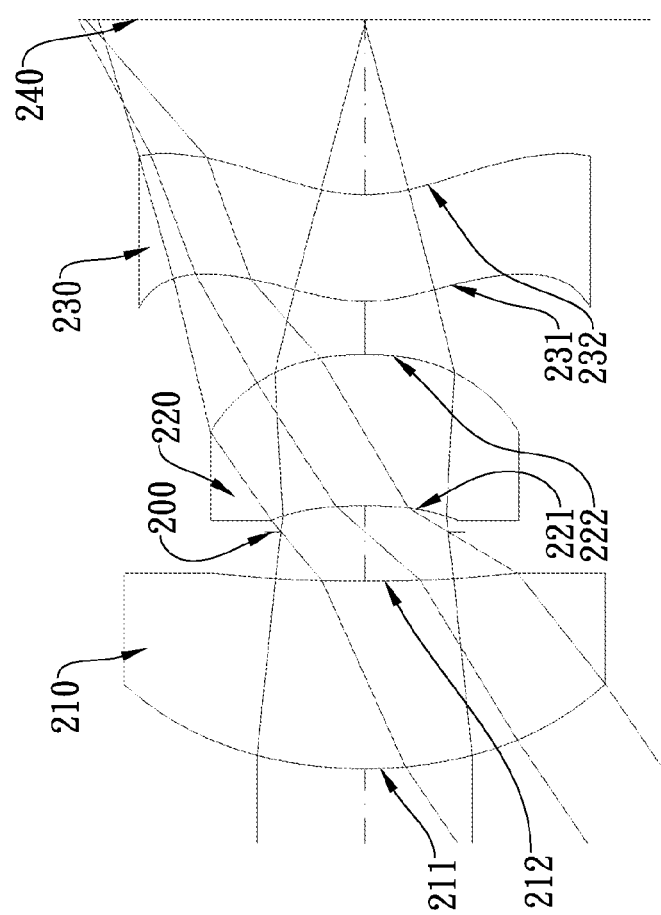
FIG. 2A shows a photographing optical lens system in accordance with a second embodiment of the present invention.
Figure 2B:
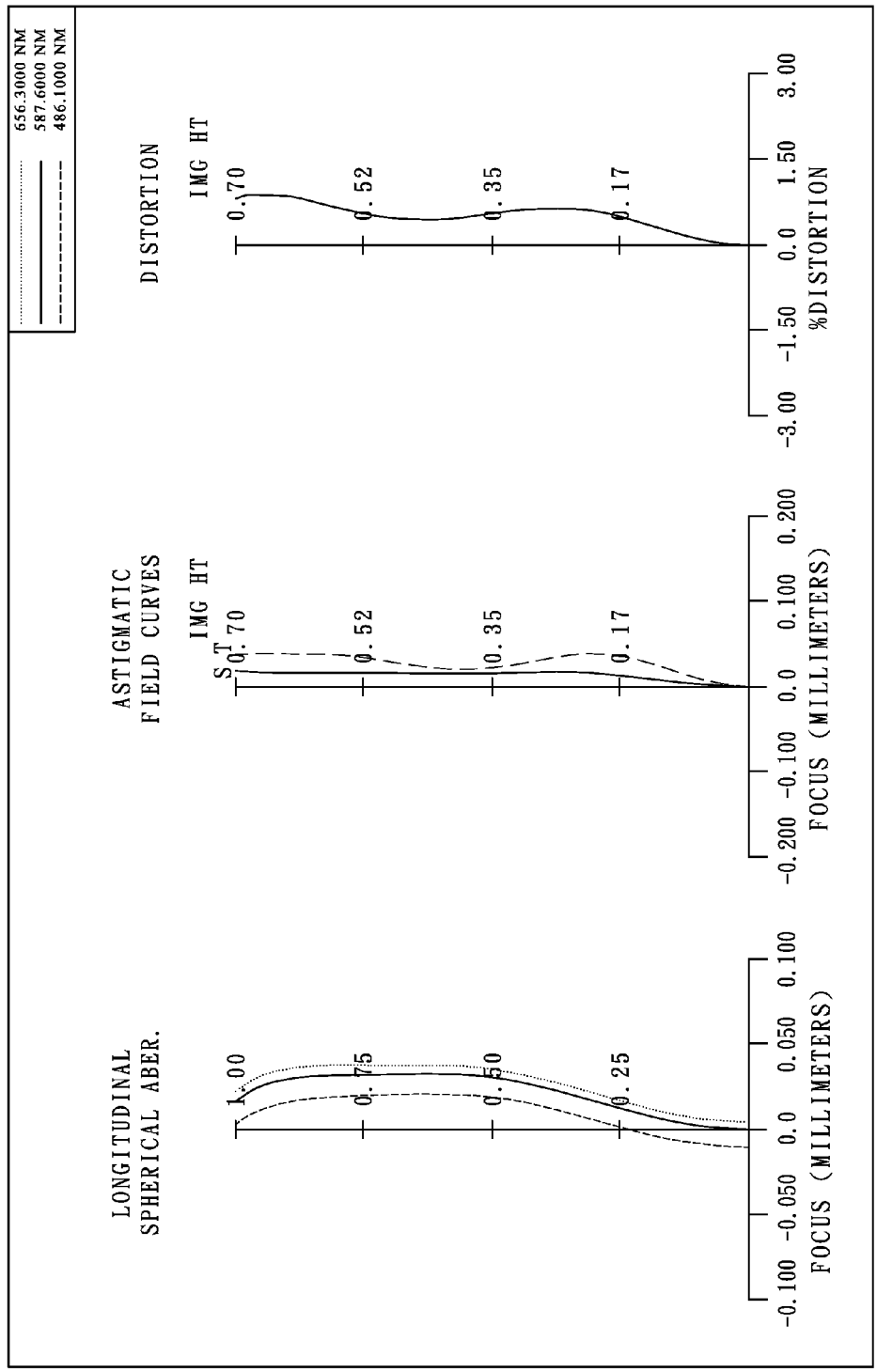
FIG. 2B shows the aberration curves of the second embodiment of the present invention.

FIG. 2A shows a photographing optical lens system in accordance with a second embodiment of the present invention, and FIG. 2B shows the aberration curves of the second embodiment of the present invention. The photographing optical lens system of the second embodiment of the present invention mainly comprises three lens elements, in order from the object side to the image side: a plastic first lens element 210 with positive refractive power having a convex object-side surface 211 and a concave image-side surface 212, the object-side and image-side surfaces 211 and 212 thereof being aspheric; a plastic second lens element 220 with positive refractive power having a concave object-side surface 221 and a convex image-side surface 222, the object-side and image-side surfaces 221 and 222 thereof being aspheric; a plastic third lens element 230 with positive refractive power having a convex object-side surface 231 and a concave image-side surface 232, the object-side and image-side surfaces 231 and 232 thereof being aspheric, at least one of the surfaces having at least one inflection point; wherein an aperture stop 200 is disposed between the first lens element 210 and the second lens element 220, and there is an image plane 240 in the photographing optical lens system.

The equation of the aspheric surface profiles of the second embodiment has the same form as that of the first embodiment.

In the second embodiment of the present photographing optical lens system, the focal length of the photographing optical lens system is f, and it satisfies the relation: f=1.10 (mm).

In the second embodiment of the present photographing optical lens system, the f-number of the photographing optical lens system is Fno, and it satisfies the relation: Fno=2.04

In the second embodiment of the present photographing optical lens system, half of the maximal field of view of the photographing optical lens system is HFOV, and it satisfies the relation: HFOV=32.4 deg.

In the second embodiment of the present photographing optical lens system, the thickness on the optical axis of the third lens element 230 is CT3, the thickness on the optical axis of the first lens element 210 is CT1, and they satisfy the relation:

$CT3/CT1=0.57$

In the second embodiment of the present photographing optical lens system, the distance on the optical axis between the second lens element 220 and the third lens element 230 is T23, the focal length of the photographing optical lens system is f, and they satisfy the relation:

$T23/f=0.13$

In the second embodiment of the present photographing optical lens system, the radius of curvature on the object-side surface 231 of the third lens element 230 is R5, the focal length of the photographing optical lens system is f, and they satisfy the relation:

$R5/f=0.34$

In the second embodiment of the present photographing optical lens system, the radius of curvature on the image-side surface 232 of the third lens element 230 is R6, the focal length of the photographing optical lens system is f, and they satisfy the relation:

$R6/f=0.36$

In the second embodiment of the present photographing optical lens system, the radius of curvature on the object-side surface 221 of the second lens element 220 is R3, the radius of curvature on the image-side surface 222 of the second lens element 220 is R4, and they satisfy the relation:

$(R3+R4)/(R3-R4)=11.46$

In the second embodiment of the present photographing optical lens system, the radius of curvature on the object-side surface 231 of the third lens element 230 is R5, the radius of curvature on the image-side surface 232 of the third lens element 230 is R6, and they satisfy the relation:

$(R5+R6)/(R5-R6)=-31.87$

In the second embodiment of the present photographing optical lens system, the focal length of the photographing optical lens system is f, the focal length of the first lens element 210 is f1, and they satisfy the relation:

$f/f1=0.47$

In the second embodiment of the present photographing optical lens system, the focal length of the photographing optical lens system is f, the focal length of the second lens element 220 is f2, and they satisfy the relation:

$|f/f2|=0.23$

In the second embodiment of the present photographing optical lens system, the focal length of the third lens element 230 is f3, the focal length of the first lens element 210 is f1, and they satisfy the relation:

$f3/f1=0.95$

In the second embodiment of the present photographing optical lens system, an electronic sensor is disposed at the image plane 240 for image formation. The distance on the optical axis between the aperture stop 200 and the electronic sensor is SL, the distance on the optical axis between the object-side surface 211 of the first lens element 210 and the electronic sensor is TTL, and they satisfy the relation:

$SL/TTL=0.68$

In the second embodiment of the present photographing optical lens system, the distance on the optical axis between the object-side surface 211 of the first lens element 210 and the electronic sensor is TTL, half of the diagonal length of the effective pixel area of the electronic sensor is ImgH, and they satisfy the relation:

$TTL/ImgH=2.82$

The detailed optical data of the second embodiment is shown in FIG. 6A (TABLE 3), and the aspheric surface data is shown in FIG. 6B (TABLE 4), wherein the units of the radius of curvature, the thickness and the focal length are expressed in mm, and HFOV is half of the maximal field of view.

Figure 3A:
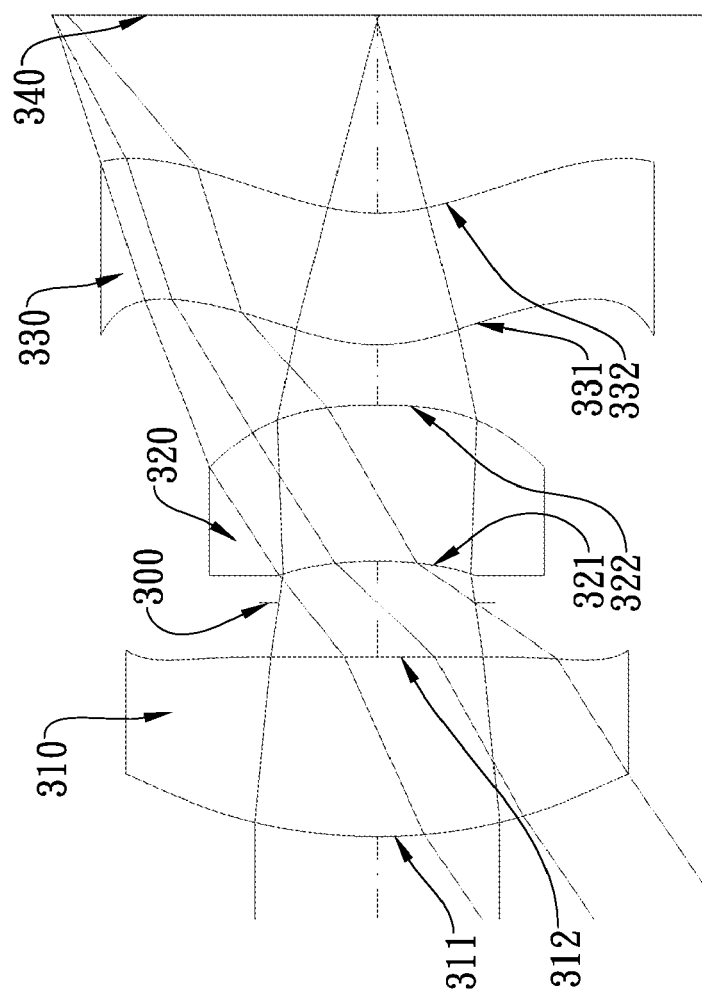
FIG. 3A shows a photographing optical lens system in accordance with a third embodiment of the present invention.
Figure 3B:
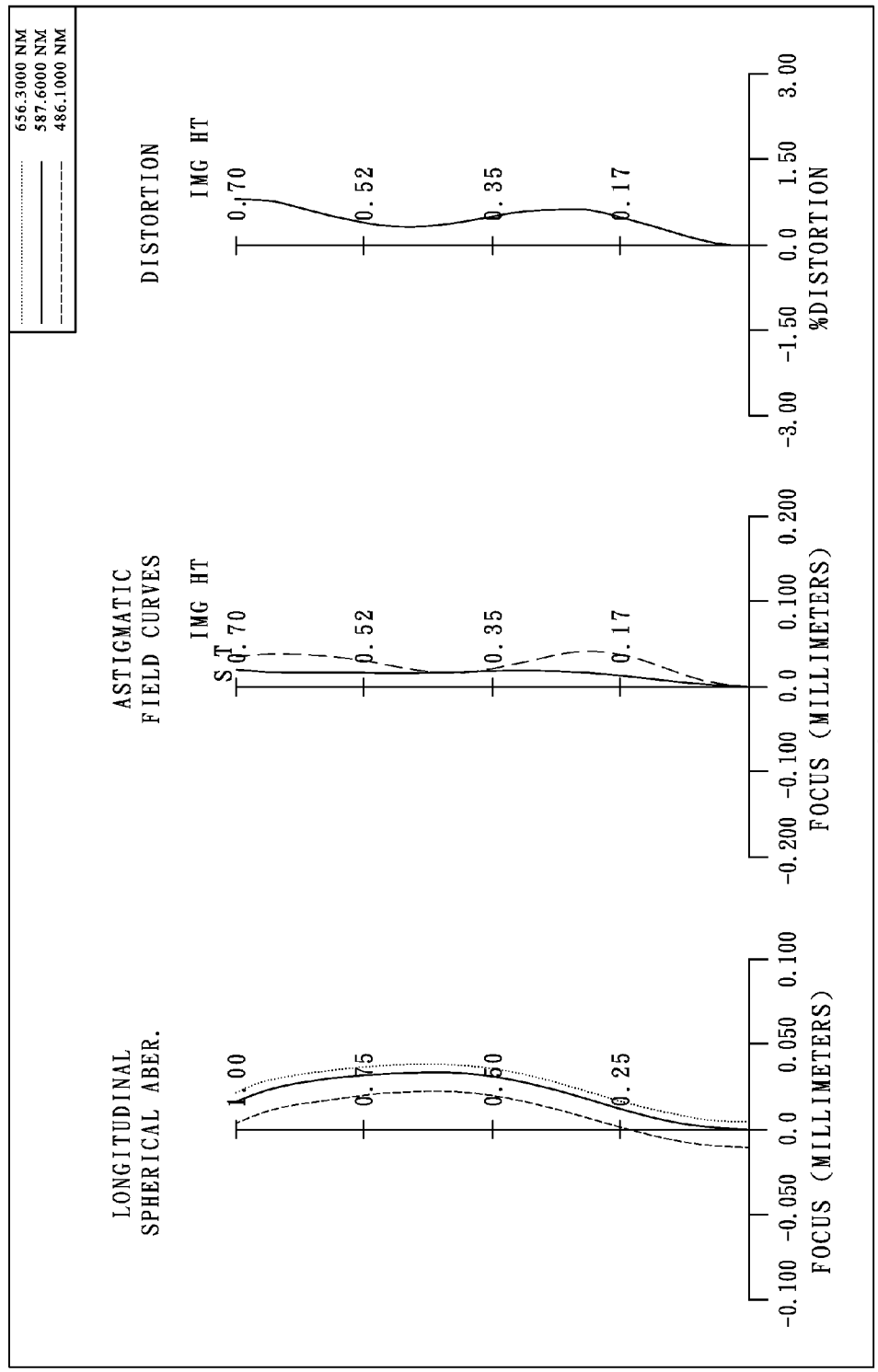
FIG. 3B shows the aberration curves of the third embodiment of the present invention.

FIG. 3A shows a photographing optical lens system in accordance with a third embodiment of the present invention, and FIG. 3B shows the aberration curves of the third embodiment of the present invention. The photographing optical lens system of the third embodiment of the present invention mainly comprises three lens elements, in order from the object side to the image side: a plastic first lens element 310 with positive refractive power having a convex object-side surface 311 and a convex image-side surface 312, the object-side and image-side surfaces 311 and 312 thereof being aspheric; a plastic second lens element 320 with negative refractive power having a concave object-side surface 321 and a convex image-side surface 322, the object-side and image-side surfaces 321 and 322 thereof being aspheric; a plastic third lens element 330 with positive refractive power having a convex object-side surface 331 and a concave image-side surface 332, the object-side and image-side surfaces 331 and 332 thereof being aspheric, at least one of the surfaces having at least one inflection point; wherein an aperture stop 300 is disposed between the first lens element 310 and second lens element 320, and there is an image plane 340 in the photographing optical lens system.

The equation of the aspheric surface profiles of the third embodiment has the same form as that of the first embodiment.

In the third embodiment of the present photographing optical lens system, the focal length of the photographing optical lens system is f, and it satisfies the relation: f=1.10 (mm).

In the third embodiment of the present photographing optical lens system, the f-number of the photographing optical lens system is Fno, and it satisfies the relation: Fno=2.04

In the third embodiment of the present photographing optical lens system, half of the maximal field of view of the photographing optical lens system is HFOV, and it satisfies the relation: HFOV=32.4 deg.

In the third embodiment of the present photographing optical lens system, the thickness on the optical axis of the third lens element 330 is CT3, the thickness on the optical axis of the first lens element 310 is CT1, and they satisfy the relation:

$CT3/CT1=0.73$

In the third embodiment of the present photographing optical lens system, the distance on the optical axis between the second lens element 320 and the third lens element 330 is T23, the focal length of the photographing optical lens system is f, and they satisfy the relation:

$T23/f=0.13$

In the third embodiment of the present photographing optical lens system, the radius of curvature on the object-side surface 331 of the third lens element 330 is R5, the focal length of the photographing optical lens system is f, and they satisfy the relation:

$R5/f=0.31$

In the third embodiment of the present photographing optical lens system, the radius of curvature on the image-side surface 332 of the third lens element 330 is R6, the focal length of the photographing optical lens system is f, and they satisfy the relation:

$R6/f=0.39$

In the third embodiment of the present photographing optical lens system, the radius of curvature on the object-side surface 321 of the second lens element 320 is R3, the radius of curvature on the image-side surface 322 of the second lens element 320 is R4, and they satisfy the relation:

$(R3+R4)/(R3-R4)=-6.05$

In the third embodiment of the present photographing optical lens system, the radius of curvature on the object-side surface 331 of the third lens element 330 is R5, the radius of curvature on the image-side surface 332 of the third lens element 330 is R6, and they satisfy the relation:

$(R5+R6)/(R5-R6)=-9.60$

In the third embodiment of the present photographing optical lens system, the focal length of the photographing optical lens system is f, the focal length of the first lens element 310 is f1, and they satisfy the relation:

$f/f1=0.56$

In the third embodiment of the present photographing optical lens system, the focal length of the photographing optical lens system is f, the focal length of the second lens element 320 is f2, and they satisfy the relation:

$|f/f2|=0.12$

In the third embodiment of the present photographing optical lens system, the focal length of the third lens element 330 is f3, the focal length of the first lens element 310 is f1, and they satisfy the relation:

$f3/f1=0.75$

In the third embodiment of the present photographing optical lens system, an electronic sensor is disposed at the image plane 340 for image formation. The distance on the optical axis between the aperture stop 300 and the electronic sensor is SL, the distance on the optical axis between the object-side surface 311 of the first lens element 310 and the electronic sensor is TTL, and they satisfy the relation:

$SL/TTL=0.72$

In the third embodiment of the present photographing optical lens system, the distance on the optical axis between the object-side surface 311 of the first lens element 310 and the electronic sensor is TTL, half of the diagonal length of the effective pixel area of the electronic sensor is ImgH, and they satisfy the relation:

$TTL/ImgH=2.74$

The detailed optical data of the third embodiment is shown in FIG. 7A (TABLE 5), and the aspheric surface data is shown in FIG. 7B (TABLE 6), wherein the units of the radius of curvature, the thickness and the focal length are expressed in mm, and HFOV is half of the maximal field of view.

Figure 4A:
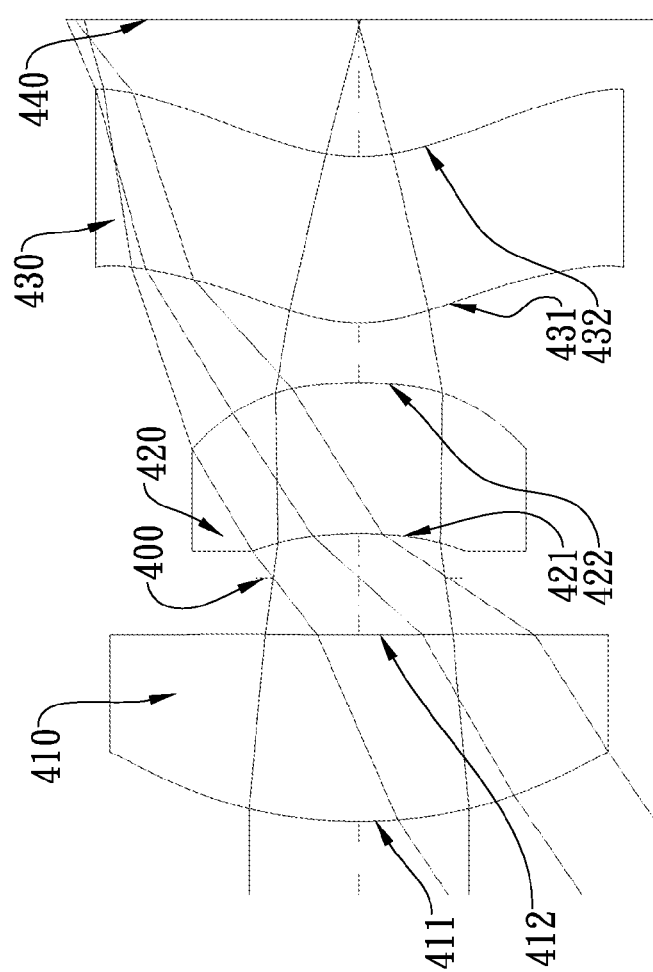
FIG. 4A shows a photographing optical lens system in accordance with a fourth embodiment of the present invention.
Figure 4B:
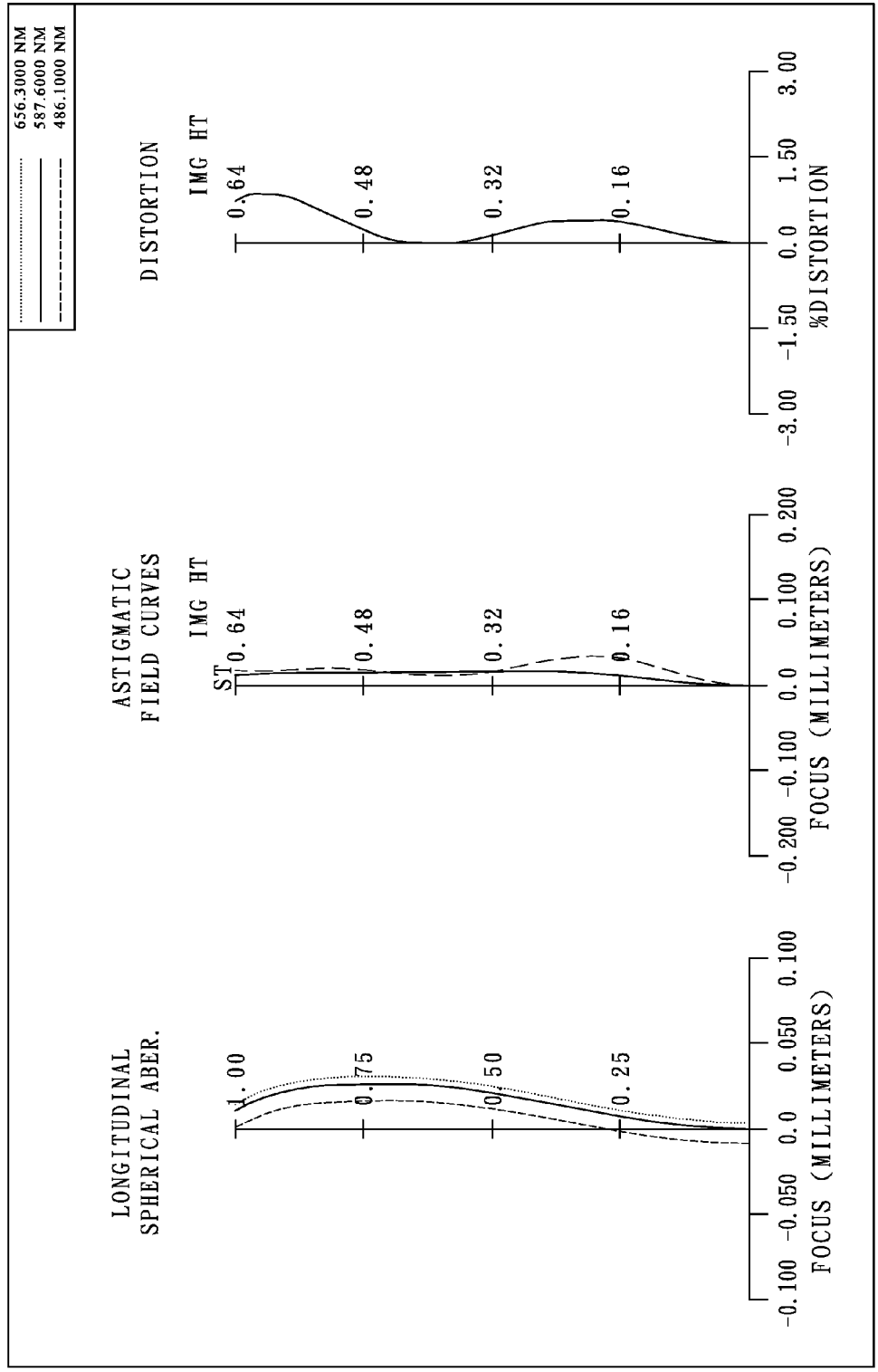
FIG. 4B shows the aberration curves of the fourth embodiment of the present invention.

FIG. 4A shows a photographing optical lens system in accordance with a fourth embodiment of the present invention, and FIG. 4B shows the aberration curves of the fourth embodiment of the present invention. The photographing optical lens system of the fourth embodiment of the present invention mainly comprises three lens elements, in order from the object side to the image side: a plastic first lens element 410 with positive refractive power having a convex object-side surface 411 and a concave image-side surface 412, the object-side and image-side surfaces 411 and 412 thereof being aspheric; a plastic second lens element 420 with negative refractive power having a concave object-side surface 421 and a convex image-side surface 422, the object-side and image-side surfaces 421 and 422 thereof being aspheric; a plastic third lens element 430 with positive refractive power having a convex object-side surface 431 and a concave image-side surface 432, the object-side and image-side surfaces 431 and 432 thereof being aspheric, at least one of the surfaces having at least one inflection point; wherein an aperture stop 400 is disposed between the first lens element 410 and the second lens element 420, and there is an image plane 440 in the photographing optical lens system.

The equation of the aspheric surface profiles of the fourth embodiment has the same form as that of the first embodiment.

In the fourth embodiment of the present photographing optical lens system, the focal length of the photographing optical lens system is f, and it satisfies the relation: f=1.02 (mm).

In the fourth embodiment of the present photographing optical lens system, the f-number of the photographing optical lens system is Fno, and it satisfies the relation: Fno=2.04.

In the fourth embodiment of the present photographing optical lens system, half of the maximal field of view of the photographing optical lens system is HFOV, and it satisfies the relation: HFOV=32.5 deg.

In the fourth embodiment of the present photographing optical lens system, the thickness on the optical axis of the third lens element 430 is CT3, the thickness on the optical axis of the first lens element 410 is CT1, and they satisfy the relation:

$CT3/CT1=0.89$

In the fourth embodiment of the present photographing optical lens system, the distance on the optical axis between the second lens element 420 and the third lens element 430 is T23, the focal length of the photographing optical lens system is f, and they satisfy the relation:

$T23/f=0.14$

In the fourth embodiment of the present photographing optical lens system, the radius of curvature on the object-side surface 431 of the third lens element 430 is R5, the focal length of the photographing optical lens system is f, and they satisfy the relation:

$R5/f=0.34$

In the fourth embodiment of the present photographing optical lens system, the radius of curvature on the image-side surface 432 of the third lens element 430 is R6, the focal length of the photographing optical lens system is f, and they satisfy the relation:

$R6/f=0.41$

In the fourth embodiment of the present photographing optical lens system, the radius of curvature on the object-side surface 421 of the second lens element 420 is R3, the radius of curvature on the image-side surface 422 of the second lens element 420 is R4, and they satisfy the relation:

$(R3+R4)/(R3-R4)=-5.59$

In the fourth embodiment of the present photographing optical lens system, the radius of curvature on the object-side surface 431 of the third lens element 430 is R5, the radius of curvature on the image-side surface 432 of the third lens element 430 is R6, and they satisfy the relation:

$(R5+R6)/(R5-R6)=-10.32$

In the fourth embodiment of the present photographing optical lens system, the focal length of the photographing optical lens system is f, the focal length of the first lens element 410 is f1, and they satisfy the relation:

$f/f1=0.53$

In the fourth embodiment of the present photographing optical lens system, the focal length of the photographing optical lens system is f, the focal length of the second lens element 420 is f2, and they satisfy the relation:

$|f/f2|=0.12$

In the fourth embodiment of the present photographing optical lens system, the focal length of the third lens element 430 is f3, the focal length of the first lens element 410 is f1, and they satisfy the relation:

$f3/f1=0.66$

In the fourth embodiment of the present photographing optical lens system, an electronic sensor is disposed at the image plane 440 for image formation. The distance on the optical axis between the aperture stop 400 and the electronic sensor is SL, the distance on the optical axis between the object-side surface 411 of the first lens element 410 and the electronic sensor is TTL, and they satisfy the relation:

$SL/TTL=0.70$

In the fourth embodiment of the present photographing optical lens system, the distance on the optical axis between the object-side surface 411 of the first lens element 410 and the electronic sensor is TTL, half of the diagonal length of the effective pixel area of the electronic sensor is ImgH, and they satisfy the relation:

$TTL/ImgH=2.90$

The detailed optical data of the fourth embodiment is shown in FIG. 8A (TABLE 7), and the aspheric surface data is shown in FIG. 8B (TABLE 8), wherein the units of the radius of curvature, the thickness and the focal length are expressed in mm, and HFOV is half of the maximal field of view.

It is to be noted that TABLES 1-8 (illustrated in FIGS. 5A-8B respectively) show different data of the different embodiments, however, the data of the different embodiments are obtained from experiments. Therefore, any photographing optical lens system of the same structure is considered to be within the scope of the present invention even if it uses different data. The embodiments depicted above and the appended drawings are exemplary and are not intended to limit the claim scope of the present invention. TABLE 9 (illustrated in FIG. 9) shows the data of the respective embodiments resulting from the equations.

What is claimed is:

1. A photographing optical lens system comprising, in order from an object side to an image side:
    a first lens element with positive refractive power having a convex object-side surface;
    a second lens element with positive refractive power having a convex image-side surface;
    a third lens element with positive refractive power having a convex object-side surface and a concave image-side surface, the object-side and the image-side surfaces thereof being aspheric, at least one of the surfaces having at least one inflection point;
    wherein the photographing optical lens system further comprises an aperture stop disposed between an imaged object and the second lens element, and there are three lens elements with refractive power; wherein a focal length of the photographing optical lens system is f, a focal length of the first lens element is f1, a distance on the optical axis between the second and the third lens elements is T23, and they satisfy the relation:

$0.23<f/f1<0.67$;

$0.05<T23/f<0.18$.

2. The photographing optical lens system according to claim 1, wherein the focal length of the photographing optical lens system is f, a focal length of the second lens element is f2, and they satisfy the relation:

$0.1<f/f2<0.5$.

3. The photographing optical lens system according to claim 2, wherein a thickness on the optical axis of the third lens element is CT3, a thickness on the optical axis of the first lens element is CT1, and they satisfy the relation:

$0.4<CT3/CT1<0.8$.

4. The photographing optical lens system according to claim 3, wherein the focal length of the photographing optical lens system is f, the focal length of the first lens element is f1, and they satisfy the relation:

$0.30<f/f1<0.57$.

5. The photographing optical lens system according to claim 3, wherein the photographing optical lens system further comprises an electronic sensor at an image plane for image formation; wherein a distance on the optical axis between the aperture stop and the electronic sensor is SL, a distance on the optical axis between the object-side surface of the first lens element and the electronic sensor is TTL, the distance on the optical axis between the second and the third lens elements is T23, the focal length of the photographing optical lens system is f, and they satisfy the relation:

$0.6<SL/TTL<0.9$;

$0.07<T23/f<0.14$.

6. The photographing optical lens system according to claim 1, wherein a focal length of the third lens element is f3, the focal length of the first lens element is f1, and they satisfy the relation:

$0.6<f3/f1<1.1$.

7. The photographing optical lens system according to claim 6, wherein a radius of curvature on the object-side surface of the second lens element is R3, a radius of curvature on the image-side surface of the second lens element is R4, and they satisfy the relation:

$5<(R3+R4)/(R3-R4)<13$.

8. The photographing optical lens system according to claim 1, wherein the photographing optical lens system further comprises an electronic sensor at an image plane for image formation; wherein the distance on the optical axis between the aperture stop and the electronic sensor is SL, the distance on the optical axis between the object-side surface of the first lens element and the electronic sensor is TTL, a radius of curvature on the image-side surface of the third lens element is R6, the focal length of the photographing optical lens system is f, and they satisfy the relation:

$0.6<SL/TTL<0.9$;

$0.0<R6/f<1.0$.

9. The photographing optical lens system according to claim 8, wherein the radius of curvature on the object-side surface of the second lens element is R3, the radius of curvature on the image-side surface of the second lens element is R4, a radius of curvature on the object-side surface of the third lens element is R5, the radius of curvature on the image-side surface of the third lens element is R6, and they satisfy the relation:

$|(R3+R4)/(R3-R4)|<|(R5+R6)/(R5-R6)|$.

10. The photographing optical lens system according to claim 2, wherein the photographing optical lens system further comprises an electronic sensor at an image plane for image formation; wherein the distance on the optical axis between the object-side surface of the first lens element and the electronic sensor is TTL, half of the diagonal length of the effective pixel area of the electronic sensor is ImgH, and they satisfy the relation:

$TTL/ImgH<3.0$.

11. A photographing optical lens system comprising, in order from an object side to an image side:
 a first lens element with positive refractive power having a convex object-side surface;
 a second lens element with positive refractive power having a convex image-side surface;
 a third lens element with positive refractive power having a convex object-side surface and a concave image-side surface, the object-side and the image-side surfaces thereof being aspheric, made of plastic; and
 wherein the photographing optical lens system further comprises an aperture stop disposed between an imaged object and the second lens element, and there are three lens elements with refractive power;
 wherein a focal length of the third lens element is f3, a focal length of the first lens element is f1, a radius of curvature on the image-side surface of the third lens element is R6, a focal length of the photographing optical lens system is f, and they satisfy the relations:

$0.3<f3/f1<1.3$;

$0.0<R6/f<1.0$.

12. The photographing optical lens system according to claim 11, wherein the second lens element has a concave object-side surface, and at least one of the object-side and the image-side surfaces is aspheric.

13. The photographing optical lens system according to claim 12, wherein the focal length of the photographing optical lens system is f, the focal length of the first lens element is f1, and they satisfy the relation:

$0.23<f/f1<0.67$.

14. The photographing optical lens system according to claim 11, wherein the radius of curvature on the image-side surface of the third lens element is R6, the focal length of the photographing optical lens system is f, and they satisfy the relation:

$0.2<R6/f<0.6$.

15. The photographing optical lens system according to claim 11, wherein the photographing optical lens system further comprises an electronic sensor at an image plane for image formation, a distance on the optical axis between the aperture stop and the electronic sensor is SL, a distance on the optical axis between the object-side surface of the first lens element and the electronic sensor is TTL, and they satisfy the relation:

$0.6<SL/TTL<0.9$.

16. The photographing optical lens system according to claim 12, wherein a radius of curvature on the object-side surface of the second lens element is R3, a radius of curvature on the image-side surface of the second lens element is R4, a radius of curvature on the object-side surface of the third lens element is R5, the radius of curvature on the image-side surface of the third lens element is R6, and they satisfy the relation:

$|(R3+R4)/(R3-R4)|<|(R5+R6)/(R5-R6)|$.

17. The photographing optical lens system according to claim 15, wherein the radius of curvature on the object-side surface of the second lens element is R3, the radius of curvature on the image-side surface of the second lens element is R4, and they satisfy the relation:

$5<(R3+R4)/(R3-R4)<13.$

18. The photographing optical lens system according to claim 15, wherein a distance on the optical axis between the second and the third lens elements is T23, the focal length of the photographing optical lens system is f, and they satisfy the relation:

$0.05<T23/f<0.18.$

19. A photographing optical lens system comprising, in order from an object side to an image side:
- a first lens element with positive refractive power having a convex object-side surface;
- a second lens element having a concave object-side surface and a convex image-side surface;
- a third lens element with positive refractive power having a convex object-side surface, the object-side and the image-side surfaces thereof being aspheric, at least one of the surfaces having at least one inflection point;
- wherein the photographing optical lens system further comprises an aperture stop disposed between an imaged object and the second lens element, and there are three lens elements with refractive power;
- wherein a focal length of the photographing optical lens system is f, a focal length of the first lens element is f1, a radius of curvature on the object-side surface of the second lens element is R3, a radius of curvature on the image-side surface of the second lens element is R4, a radius of curvature on the object-side surface of the third lens element is R5, a radius of curvature on the image-side surface of the third lens element is R6, and they satisfy the relations:

$0.23<f/f1<0.67;$ $|(R3+R4)/(R3-R4)|<|(R5+R6)/(R5-R6)|.$

20. The photographing optical lens system according to claim 19, wherein the first lens element has a concave image-side surface, a focal length of the third lens element is f3, the focal length of the first lens element is f1, and they satisfy the relation:

$0.3<f3/f1<1.3.$

21. The photographing optical lens system according to claim 20, wherein a distance on the optical axis between the second and the third lens elements is T23, the focal length of the photographing optical lens system is f, and they satisfy the relation:

$0.05<T23/f<0.18.$

22. The photographing optical lens system according to claim 19, wherein the second lens element has at least one aspheric surface from the object-side and the image-side surfaces, the focal length of the photographing optical lens system is f, a focal length of the second lens element is f2, and they satisfy the relation:

$|f/2|<0.5.$

23. The photographing optical lens system according to claim 22, wherein the radius of curvature on the object-side surface of the third lens element is R5, the radius of curvature on the image-side surface of the third lens element is R6, the focal length of the photographing optical lens system is f, and they satisfy the relation:

$0.25<R5/f<0.65;$ $0.0<R6/f<1.0.$

24. The photographing optical lens system according to claim 22, wherein the focal length of third lens element is f3, the focal length of the first lens element is f1, and they satisfy the relation:

$0.6<f3/f1<1.1.$

25. The photographing optical lens system according to claim 19, wherein the focal length of the photographing optical lens system is f, the focal length of the first lens element is f1, and they satisfy the relation:

$0.30<f/f1<0.57.$

* * * * *